United States Patent
Mannheim Astete et al.

(10) Patent No.: US 12,134,247 B2
(45) Date of Patent: Nov. 5, 2024

(54) AUTOMOTIVE LAMINATE CAMERA HEATING SYSTEM WITH LOW DISTORTION

(71) Applicant: AGP America S.A., Ciudad de Panama (PA)

(72) Inventors: Mario Arturo Mannheim Astete, Lima (PE); Laura Granados Caro, Lima (PE)

(73) Assignee: AGP America S.A., Panama (PA)

( * ) Notice: Subject to any disclaimer, the term of this patent is extended or adjusted under 35 U.S.C. 154(b) by 1049 days.

(21) Appl. No.: 16/982,190

(22) PCT Filed: Mar. 20, 2019

(86) PCT No.: PCT/IB2019/052290
§ 371 (c)(1),
(2) Date: Sep. 18, 2020

(87) PCT Pub. No.: WO2019/180651
PCT Pub. Date: Sep. 26, 2019

(65) Prior Publication Data
US 2021/0039358 A1 Feb. 11, 2021

Related U.S. Application Data

(60) Provisional application No. 62/645,601, filed on Mar. 20, 2018.

(51) Int. Cl.
*B23B 17/00* (2006.01)
*B32B 17/10* (2006.01)

(52) U.S. Cl.
CPC .. *B32B 17/10036* (2013.01); *B32B 17/10174* (2013.01); *B32B 17/10119* (2013.01);
(Continued)

(58) Field of Classification Search
CPC ........ B23B 17/10036; B23B 17/10174; B23B 17/10119; B23B 17/10541; B32B 2315/08
(Continued)

(56) References Cited

U.S. PATENT DOCUMENTS

2016/0159050 A1* 6/2016 Lu .................. B32B 7/023 428/515
2017/0028687 A1* 2/2017 DeRosa ............. B32B 7/02

FOREIGN PATENT DOCUMENTS

WO WO-2018185619 A2 * 10/2018 ............ B29C 70/82

* cited by examiner

*Primary Examiner* — James E McDonough
(74) *Attorney, Agent, or Firm* — The Morales Law Firm; Joseph L. Morales

(57) ABSTRACT

The use of camera-based safety systems is growing at a rapid rate in automobiles where they are used to provide lane departure warning, collision avoidance, adaptive cruise control and other functions. As the industry moves towards full autonomous capability, the number of cameras and the resolution are increasing. For proper operation, the cameras require a clear undistorted field of view. Keeping the camera area free of snow and ice has been a problem. A resistive heating circuit is typically used to keep the area clear. For rapid clearing the circuit needs to operate at a high-power level. Due to the temperature dependent index of refraction of the plastic interlayer, severe distortion can result from the non-isothermal heating resulting from the spacing of the circuit elements. The laminate of the invention reduces distortion by removing the interlayer in the camera field of view and replacing with a plastic having a more temperature stable index of refraction.

15 Claims, 5 Drawing Sheets

(52) U.S. Cl.
CPC ... *B32B 17/10293* (2013.01); *B32B 17/10348* (2013.01); *B32B 17/10541* (2013.01); *B32B 17/1077* (2013.01); *B32B 17/10788* (2013.01); *B32B 2315/08* (2013.01); *B32B 2605/006* (2013.01)

(58) Field of Classification Search
USPC .................................................. 106/31.95
See application file for complete search history.

AUTOMOTIVE LAMINATE CAMERA HEATING SYSTEM WITH LOW DISTORTION

FIELD OF THE INVENTION

This invention relates to the field of laminated automotive glazing.

BACKGROUND OF THE INVENTION

The use of camera-based safety systems, requiring a wide field of view and a high level of optical clarity, is growing at a rapid rate. Camera-based systems are used to provide a wide array of safety functions including adaptive cruise control, emergency braking, obstacle detection, lane departure warning and support for autonomous operation. A bright, clear, undistorted field of view and unaltered natural color are especially critical for camera-based systems to perform as intended. This is essential for these systems to be able to quickly classify and differentiate between objects, capture text, identify signage and signals, and to operate with minimal lighting.

As the industry moves towards full autonomous capability, the number of cameras and the resolution of the cameras are both increasing. The cameras require a high, forward looking field of view and so must typically be mounted on the windshield and in the wiper area so that the field of view can be kept clear of snow and rain. At the same time, windshields are becoming larger and more complex in shape. At the extreme we have the panoramic windshield on which the top edge has been substantially extended such that it comprises a portion of the vehicle roof.

The camera field of view must be kept clear of water, snow and ice for the safety systems to work properly. Further, a full autonomous vehicle must have the area clear of rain, snow and ice before the vehicle can be operated.

The cameras are usually mounted in the path of the windshield wipers. The wipers provide adequate removal of water. Keeping the camera field of view clear of snow and ice is more difficult. The air from the hot air defroster system, which is typically used to clear the windshield, is blocked by the camera assembly. While some windshields are available with full surface transparent conductive coating or embedded wire resistive heating, the power density that these windshields operate at is not sufficient to provide for the rapid clearing that is needed for a short drive-away time.

Opaque electric heating circuits, which are mounted to the inside surface of the glass or incorporated into the camera assembly, are only effective when the camera field of view is small. This limitation is due to the poor thermal conductivity of glass. The heating element separation distance can be no more than ~35 mm. Otherwise, the temperature rise is not sufficient to clear the glass. Resistive heating circuits which encroach on the camera field of view are typically needed with multiple camera systems having a larger field of view.

There are two primary technologies used to produce a resistive heated circuit for the camera field of view: printed silver frit and embedded wire.

Silver frit is the most common type of heated circuit used for backlites, heated wiper rests and camera defrosters. It is also the most cost effective. Silver powder is mixed with carriers, binders and finely ground glass. Other materials are also sometimes added to enhance certain properties: the firing temperate, anti-stick, chemical resistance, etc. The silver frit is applied to the glass using a silk screen or ink jet printing process prior to the heating and bending of the glass. As the flat glass is heated during the bending process, the powdered glass in the frit softens and melts, fusing to the surface of the glass. The silver frit print becomes a permanent part of the glass. The frit is said to be "fired" when this takes place. This is a vitrification process which is very similar to the process used to apply enamel finishes on bathroom fixtures, pottery, china and appliances. Resistances as low as 2 milliohms per square and line widths as narrow as 0.5 mm are possible. The primary drawback to silver print is the aesthetics of the fired silver which has a dark orange to mustard yellow color depending upon which side of the glass it is printed on, the air side or the tin side. Busbars are printed silver but may be reinforced electrically with copper strips or braids. Screen print silver circuits cannot be used on the windshield in the driver field of view as the lines are too wide and would interfere with vision.

An embedded wire resistive heated circuit is formed by embedding fine wires into the plastic bonding layer of a laminate. The wires are embedded in the plastic using heat or ultra-sound. Tungsten is a preferred material due to its tensile strength, which is 10× that of Copper and its flat black color. Heated windshields typically use tungsten wire that is in the 18-22 µm range at which point the wires are virtually invisible. The wires are embedded using an oscillating sinusoidal like pattern to reduce glare that can occur under certain lighting conditions. For positions of the glazing other than the windshield, larger wire diameters can be used. Wires are typically embedded utilizing some sort of CNC machine. Thin flat copper is used for busbars with two layers being typically used. The first layer is applied to the plastic layer prior to the embedding of the wires. The second layer is applied over top of the first layer and the two are joined by soldering or using a conductive adhesive. For some applications it may only be required to use a single layer of copper. Of course, conductors other than copper can be used.

With either method, the resistive elements are spaced from each other by some distance. The spacing will depend upon the technology and other factors. With a printed silver, the maximum spacing is ~35 mm. With a minimum line width of 0.5 mm it is not desirable to have any of the lines in the filed of view but the restriction on spacing often requires that at least one line is in the field of view. Most camera systems can tolerate but it is not optimal.

Embedded wire circuits can operate with wires as thin as 18 pm. At this diameter, they are virtually invisible to the camera system and do not present as much of a problem. At 18 µm, a typical spacing would be in the 3-6 mm range.

The closer the elements are to each other the more uniform the heating will be. Also, the greater the total length of the elements, the lower the element temperature will be as the energy is dissipated over the length of the element.

As a result, embedded wire circuits, for the same power density, will tend to have a lower element temperature and be more uniform than a printed silver circuit. Still though, there can be a significant delta in the temperature across the field of view. This is where the problem arises.

The index of refraction of a material is the ratio of the velocity of light in a vacuum to the speed in that material. Its value determines the extent to which light is refracted when entering or leaving the substance. The index of refraction is not fixed. It is a function of a multiple variable. The refractive index changes with the type of material, temperature, pressure, electric field and wavelength. For solids, temperature is one of the main factors influencing refractive index.

Thermo-optical coefficients $$\frac{\partial n}{\partial T}$$

can be estimated from a derivation of the Clausius-Mossotti relationship:

$$\frac{1}{(n-1)(n+2)}\left(\frac{\partial n}{\partial T}\right) = -\alpha\left[1 - \frac{V}{\alpha_m}\left(\frac{\partial \alpha_m}{\partial V}\right)_T\right] + \frac{1}{3\alpha_m}\left(\frac{\partial \alpha_m}{\partial T}\right)_v$$

where $\alpha_m$ is the macroscopic polarizability.

The change of $$\frac{\partial n}{\partial T}$$

depends on two counteracting effects: the change in density caused by positive coefficient of thermal expansion and the increase in polarizability with temperature. A positive thermal expansion coefficient a results in a negative thermo-optic coefficient $$\frac{\partial n}{\partial T}$$

and a positive change in polarizability with volume $$\frac{\partial \alpha_m}{\partial V}$$

results in a positive thermo-optic coefficient $$\frac{\partial n}{\partial T}.$$

In this way, materials with high coefficient of thermal expansion and high polarizability tend to have a high thermo-optic coefficient[1]. Polymer interlayers tend to have a high thermo-optic coefficient.

[1] Additional references: Handbook of optics, Volume 2, McGraw Hill. Temperature dependence of refractive characteristics of optical plastics. S N Kasarova et al 2010 J. Phys.: Conf. Ser. 253 012028. TIE-19. Temperature Coefficient of the Refractive Index, Technical information, advanced optics, Schott, 2016.

Windshields consist of minimum three layers: outer and inner glass and an interlayer. The interlayer is designed so its refractive index matches with the one from the glass to minimize light refraction. However, as the temperature of the polymer interlayer increases, the index of refraction shifts and this property no longer matches the glass refractive index. This delta in the index of refraction can result in distortion. The greater the delta T, the greater the distortion. Moreover, when the polymer interlayer is at a temperature higher than its glass transition temperature, its thermo-optic coefficient increases until it reaches a constant value. FIG. 1 shows how the thermo-optic coefficient $$\frac{\partial n}{\partial T}$$

of a polymer interlayer is affected by a raise in its temperature. As it can be notice, the coefficient is kept at a constant 34 value when T is less than Tg. Once Tg is reached and as the value of T starts raising, the coefficient $$\frac{\partial n}{\partial T}$$

starts snining 36 from the constant value. As mentioned above, once the temperature is higher enough than Tg, the thermos-optic coefficient reaches again a constant value 38.

As a result, not only do we need to wait for the snow and ice to be melted, but also for the laminate to return to an isothermal condition. It would be desirable to reduce or eliminate this distortion so as to decrease the time required for a vehicle to begin operation.

BRIEF SUMMARY OF THE INVENTION

The drawbacks with regard to distortion resulting from the shift in the index of refraction of the polymer interlayer during operation of the heating circuit are reduced if not eliminated by replacing the polymer interlayer in the camera field of view with an insert comprised of an interlayer that has index of refraction that is more stable in the temperature range that the heated circuit operates in.

Advantages:
Facilitates shorter drive-away time
Reduces distortion
Supports cameras with higher resolution
Fabricated using standard automotive glass processes and equipment.

BRIEF DESCRIPTION OF DRAWINGS

These features and advantages of the present invention will become apparent from the detailed description of the following embodiments in conjunction with the accompanying drawings, wherein.

REFERENCE NUMERALS

Figure 1:
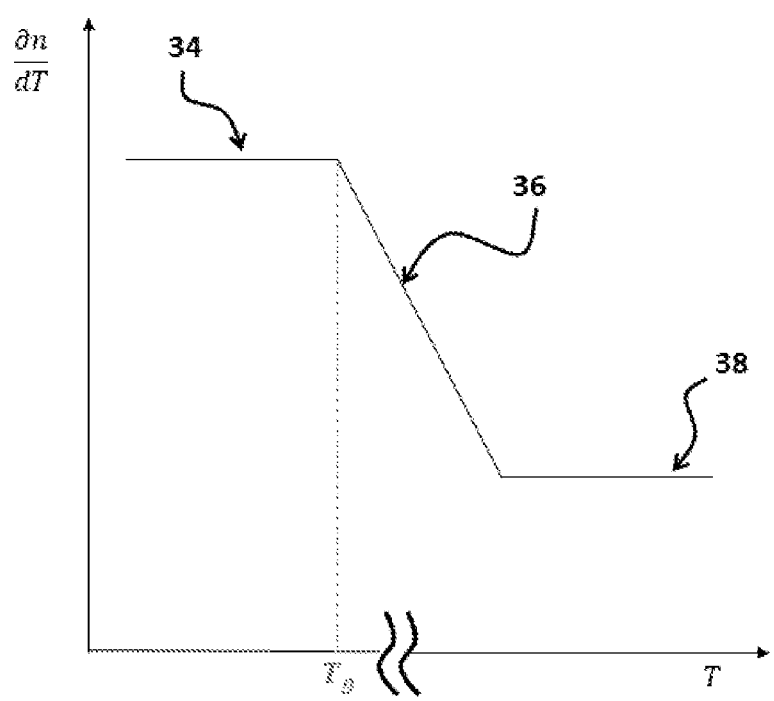
FIG. 1 depicts the thermo-plastic coefficient behavior of a polymer interlayer versus a change in its temperature.

2 Glass
4 Plastic bonding layer
6 Obscuration
8 Cutout in interlayer
12 Plastic Performance film
18 Coating
20 Sunshade 22 Clear Interlayer Insert
24 Film Insert
28 Cutout in film
32 Opening in obscuration for camera
34 First constant value zone
36 Transition zone
38 Second constant value zone
101 Surface one
102 Surface two
103 Surface three
104 Surface four
201 Outer glass layer
202 Inner glass layer

DETAILED DESCRIPTION OF THE INVENTION

Figure 2A:
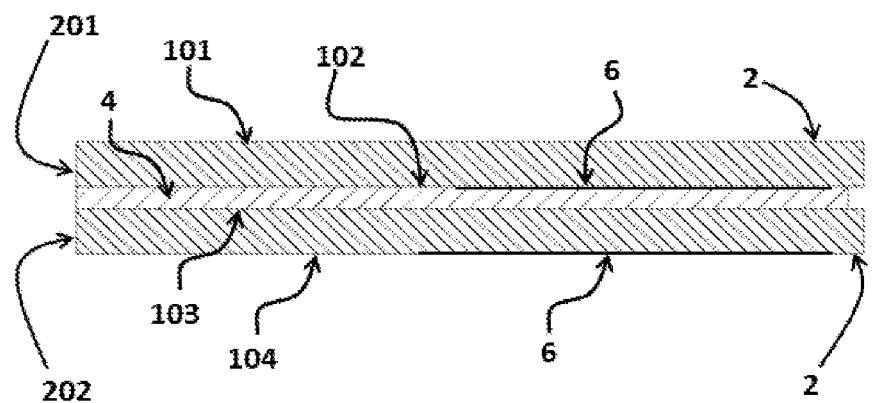
FIG. 2A is a cross section of a typical automotive laminate.
Figure 2B:
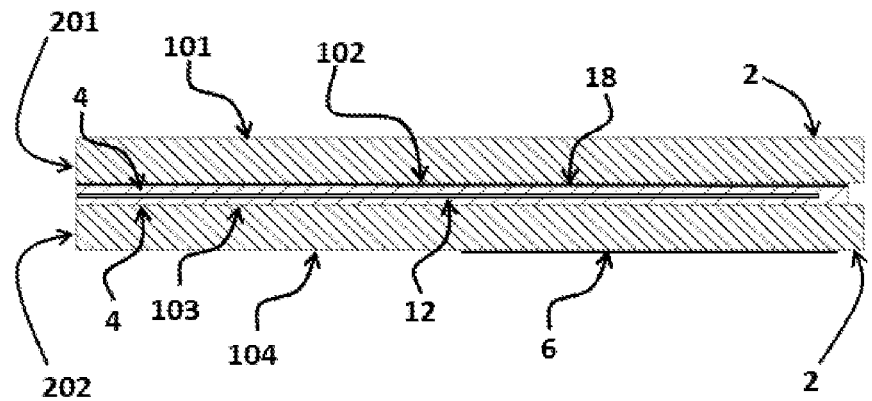
FIG. 2B is a cross section of a typical automotive laminate with coating and performance film.

The following terminology is used to describe the laminated glazing of the invention. A typical automotive laminate cross section is illustrated in FIGS. 2A and 2B. The laminate is comprised of two layers of glass, the exterior or outer 201 and interior or inner 202 that are permanently bonded together by a plastic bonding layer 4 (interlayer). The glass surface that is on the exterior of the vehicle is referred to as surface one 101 or the number one surface. The opposite face of the outer glass layer 201 is surface two 102 or the number two surface. The glass surface that is on the interior of the vehicle is referred to as surface four 104 or the number four surface. The opposite face of the inner layer of glass 202 is surface three 103 or the number three surface. Surfaces two 102 and three 103 are bonded together by the plastic bonding layer 4. An obscuration 6 may be also applied to the glass. Obscurations 6 are commonly comprised of black enamel frit printed on either the number two 102 or number four surface 104 or on both. The laminate may also comprise a coating 18 on one or more of the surfaces. The laminate may also comprise a film 12 laminated between at least two plastic bonding layers 4.

Laminated safety glass is made by bonding two sheets 201, 202 of annealed glass 2 together using a plastic bonding layer 4 comprised of a thin sheet of transparent thermo plastic (interlayer) as shown in FIGS. 2A and 2B. Annealed glass is glass that has been slowly cooled from the bending temperature down through the glass transition range. This process relieves any stress left in the glass from the bending process. Annealed glass breaks into large shards with sharp edges. When laminated glass breaks, the shards of broken glass are held together, much like the pieces of a jigsaw puzzle, by the plastic layer helping to maintain the structural integrity of the glass. A vehicle with a broken windshield can still be operated. The plastic bonding layer also helps to prevent penetration by objects striking the laminate from the exterior and in the event of a crash occupant retention is improved.

The glass layers are formed using gravity bending, press bending, cold bending or any other conventional means known in the art. Gravity and press bending methods for forming glass are well known in the art and will not be discussed in the present disclosure.

The plastic bonding layer 4 (interlayer) has the primary function of bonding the major faces of adjacent layers to each other. The material selected is typically a clear plastic when bonding one glass layer to another glass layer. For automotive use, the most commonly used plastic bonding layer 4 (interlayer) is polyvinyl butyl (PVB). In addition to polyvinyl butyl, ionoplast polymers, ethylene vinyl acetate (EVA), cast in place (CIP) liquid resin and thermoplastic polyurethane (TPU) can also be used. Interlayers are available with enhanced capabilities beyond bonding the glass layers together. The invention may include interlayers designed to dampen sound. Such interlayers are comprised whole or in part of a layer of plastic that is softer and more flexible than that normally used. The interlayer may also be of a type which has solar attenuating properties.

Automotive interlayers are made by an extrusion process. A smooth surface tends to stick to the glass, making it difficult to position on the glass and to trap air. To facilitate the handling of the plastic sheet and the removal or air (deairing) from the laminate, the surface of the plastic is normally embossed. Standard thicknesses for automotive PVB interlayer at 0.38 mm and 0.76 mm (15 and 30 mil).

A wide variety of films are available that can be incorporated into a laminate. The uses for these films include but are not limited to: solar control, variable light transmission, increased stiffness, increased structural integrity, improved penetration resistance, improved occupant retention, providing a barrier, tint, providing a sunshade, color correction, and as a substrate for functional and aesthetic graphics. The term "film" shall include all of these as well as other products that may be developed or which are currently available which enhance the performance, function, aesthetics or cost of a laminated glazing. Most films comprise at least one plastic substrate. Most films do not have adhesive properties. To incorporate into a laminate, sheets of plastic interlayer are needed on each side of the film so as to bond the film to the other layers of the laminate.

Automotive glazing often makes use of heat absorbing glass compositions to reduce the solar load on the vehicle. While a heat absorbing window can be very effective the glass will heat up and transfer energy to the passenger compartment through convective transfer and radiation. A more efficient method is to reflect the heat back to the atmosphere allowing the glass so stay cooler. This is done through the use of various infrared reflecting films and coatings. Infrared coatings and films are generally too soft to be mounted or applied to a glass surface exposed to the elements. Instead, they must be fabricated as one of the internal layers of a laminated product to prevent damage and degradation of the film or coating.

One of the big advantages of a laminated window over a tempered monolithic glazing is that a laminate can make use of infrared reflecting coatings and films in addition to heat absorbing compositions and interlayers.

Infrared reflecting coatings include but are not limited to the various metal/dielectric layered coatings applied though Magnetron Sputtered Vacuum Deposition (MSVD) as well as others known in the art that are applied via pyrolytic, spray, controlled vapor deposition (CVD), dip and other methods.

Infrared reflecting films include both metallic coated plastic substrates as well as organic based non-metallic optical films which reflect in the infrared. Most of the infrared reflecting films are comprised of a plastic film substrate having an infrared reflecting layered metallic coating applied.

If an infra-red reflecting coating is applied to one of the glass surfaces, the coating may need to be removed from the camera field of view. As such coatings are nano meters in thickness, no compensation is needed. Such coating may be combined with the method of the invention applied to the plastic layers.

The various performance films and plastic bonding layers are considered as plastic layers for the purpose of the invention. The plastic layers and the method of the invention may be combined in any possible combination including those not in the embodiments described as can be appreciated with departing from the principle of the invention.

Experimental methods have demonstrated that the critical temperature range for index of refraction induced thermal distortion is the glass transition temperature Tg of the interlayer. This is where the polymer transitions for a semi-ridge state to a limp and pliable state. The rate of change in the index of refraction, as a function of temperature is less below the glass transition range. At the very least, we want to minimize the overlap between the operating range of the circuit and the glass transition temperature of the interlayer.

The maximum resistive element temperature is in the 50° C.-70° C. range depending upon the technology, power density, ambient temperature and conductor resistance. As the heated circuit is only needed when the ambient air temperature is near the freezing point we can treat the lower end of the operating range as 0 although it could be much lower for a vehicle sitting out in the open on a cold day. So, the ideal interlayer would have a glass transition temperature that falls outside of this range, 0° C.-70° C. If that is not possible, then minimizing the overlap will help.

The typical automotive interlayer has a Tg of ~20° C. placing it well within the operating temperature range of the heated circuit. As the temperature increases, if the interlayer temperature is isothermal, the image will be displaced due to the change in the index but undistorted. This is never the case however, so distortion is produced.

A number of polyurethane plastic interlayers are available which meet automotive safety standards and that also have a Tg considerably lower than 0° C. and hence outside the operating temperature range of the heated circuit. When these interlayers are used the distortion is greatly reduced. Likewise, there are laminating resins which remain hard at very high temperatures. These also reduces heat induced distortion. These are defined as temperature stable interlayers having a glass transition range that does not have a high and low end that fall within the operating range of the heated circuit. The ideal is to have no overlap but even with a partial overlap, the distortion can be improved.

Rather than replacing just the camera field of view, the entire sheet of interlayer can be replaced. Due to the higher cost of the alternate materials, it is more economical to replace just the portion in the camera field of view.

To fabricate such a laminate, the portion of the interlayer 4 that is in the camera field of view is cutout 8 and removed. The cutout may extend to the edge of glass to facilitate assembly. Next, an insert 22, is cut to about the same size as the portion removed from the cutout 8 area, from a sheet of index of refraction temperature stable interlayer of about the same thickness as the cutout.

When the laminate is assembled the insert 22 is placed into the cutout area in the interlayer sheet 4. By accurately cutting the interlayer and insert, a close match is achieved and the parting line is invisible for all practical purposes in the finished laminate. A splice may be needed, to keep the insert in place, depending upon the shape of the bent glass and the cutout. Heat (from a soldering iron or hot air gun) or a solvent (alcohol or plasticizer) can be used to splice or tack the interlayer 4 in place if needed. Alternately, the sheets can be prepared in advanced however, a means must be provided to hold the insert in place.

Figure 5:
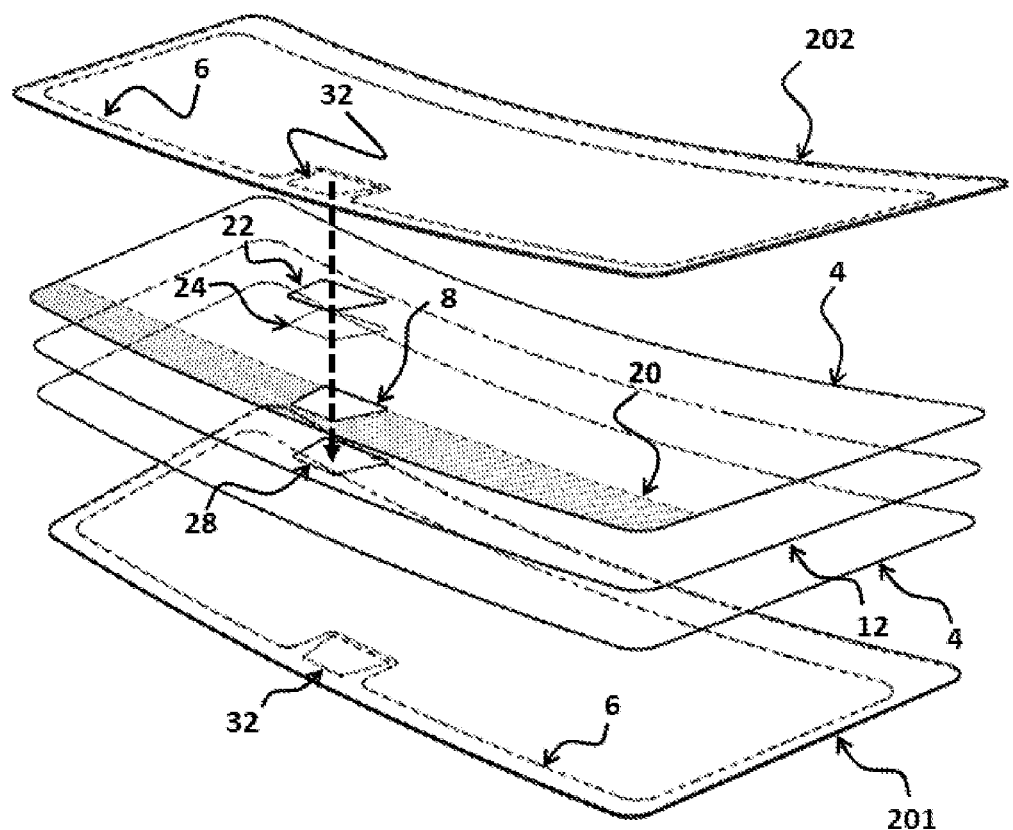
FIG. 5 is an exploded view of windshield with two plastic interlayers and a film layer and a film insert.

In some embodiments, as the one depicted in FIG. 5, when the laminate is assembled the insert 24 is placed into the cutout in the film 28. By accurately cutting the film and the film insert, a close match is achieved and the parting line is invisible for all practical purposes in the finished laminate. If needed, the film may be bonded to the interlayer, to facilitate handling and processing, to keep the film insert in place. This will depend upon the shape of the bent glass, the type of film and the cutout. Heat (from a heat gun) or a solvent (alcohol or plasticizer) can be used to bond the film insert to the interlayer, if needed. The film insert eliminates the distortion at the edge of the cutout but eliminating the abrupt change in thickness that would occur otherwise.

The assembly is then processed. Heat and pressure are applied to permanently bond the glass and plastic layers together. The insert becomes a permanent part of the laminate.

DETAILED DESCRIPTION OF THE EMBODIMENTS

Figure 3:
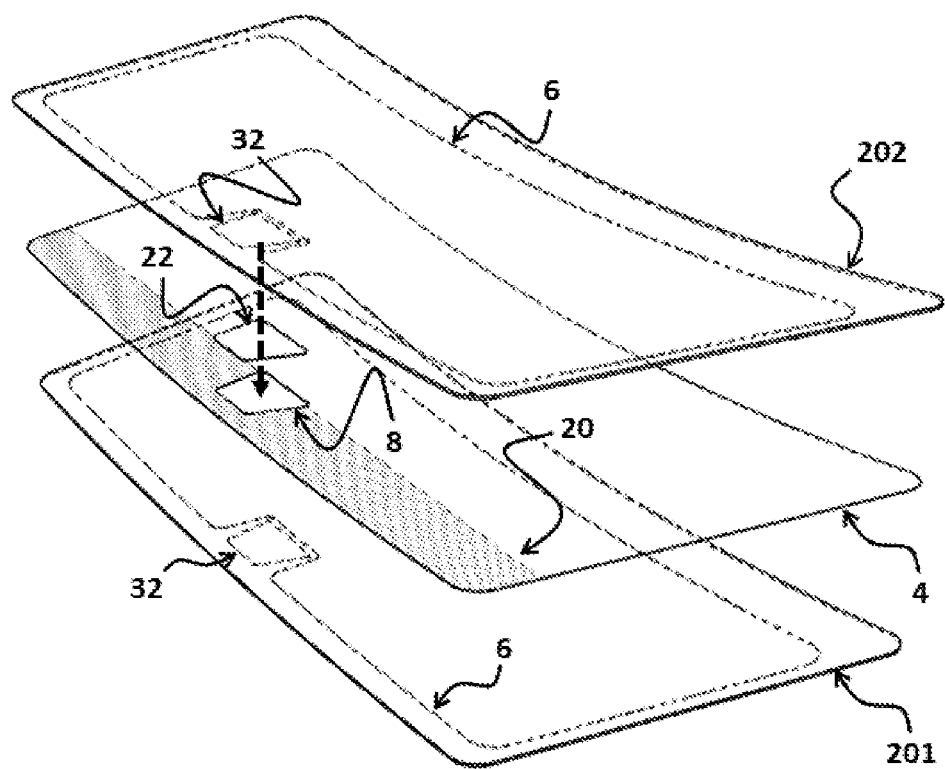
FIG. 3 is an exploded view of windshield with a single plastic interlayer.

1. The windshield of FIG. 3, has a standard soda-lime 2.5 mm thick clear exterior glass layer 201 and 2.1 mm soda-lime solar green interior glass layer 202. Black frit 6 is screen printed on surface two and surface four. The black frit 6 frames the camera field of view 32 area and also serves to obscure the boundary between the PVB and the interlayer insert 22 in the finished laminate. The glass 2 layers are thermally bent using a gravity bending process.

In the camera field of view area 32, a cutout 8 is made in the 0.76 mm thick PVB plastic bonding interlayer 4. The opening for the camera field of view 32, in the black obscuration, has a trapezoidal shape and is approximately 170 mm by 170 mm. A 0.76 mm thick PVB interlayer with a blue gradient tint sunshade is used. The AS1 line is located in the camera field of view. A cutout which is 10 mm larger than the opening in the black obscuration 6 is made in the PVB 4 plastic bonding interlayer sheet. The cutout PVB is removed and not used. An insert 22, cut to the approximate size of the cutout is made from a thermally stable polymer. The insert is placed into the opening as the bent glass layers are being assembled. The assembled laminated is processed, using standard automotive laminating equipment, and the insert becomes a permanent part of the laminate. The number four surface of the inner glass layer 202 is screen printed with a silver frit heated circuit. The circuit has a power density of 15 watts/dm2. At a starting temperature of 20° C., the maximum temperature of the circuit is 65° C. A polyurethane plastic interlayer, with a Tg lower than 0° C. and minimal overlap of its glass transition range with the heated circuit operating range is selected and used for the insert.

Figure 4:
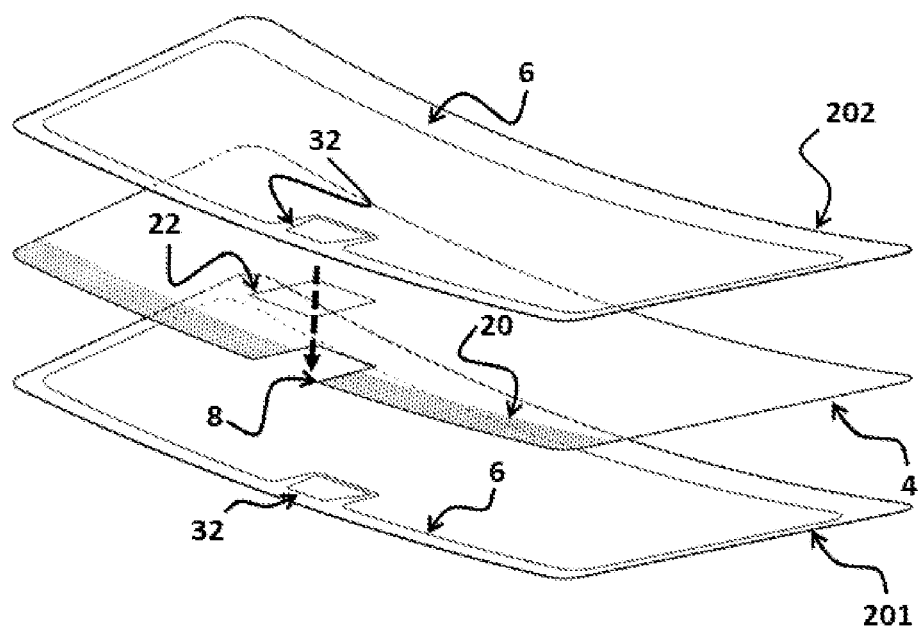
FIG. 4 is an exploded view of windshield with a single plastic interlayer having cutout extending to edge of glass.

2. The windshield of FIG. 4, has a standard soda-lime 2.5 mm thick clear exterior glass layer 201 and 2.1 mm soda-lime solar green interior glass layer 202. Black frit 6 is screen printed on surface two and surface four. The black frit 6 frames the camera field of view 32 area and also served to obscure the boundary between the PVB and the interlayer insert 22 in the finished laminate. The glass layers are thermally bent using a gravity bending process.

In the camera field of view area 32, a cutout 8 is made in the 0.76 mm thick PVB plastic bonding interlayer 4. The opening for the camera field of view 32, in the black obscuration, has a trapezoidal shape and is approximately 170 mm by 170 mm. A 0.76 mm thick PVB interlayer with a blue gradient tint sunshade is used. The AS1 line is located in the camera field of view. A rectangular cutout, extending to the edge of glass and 10 mm larger than the opening in the black obscuration 6, is made in the PVB 4 plastic bonding interlayer sheet. The cutout PVB is removed and not used. An insert 22, cut to the approximate size of the cutout is made from a thermally stable polymer. The insert is placed into the opening as the bent glass layers are being assembled. The assembled laminated is processed, using standard automotive laminating equipment, and the insert becomes a permanent part of the laminate. The number four surface of the inner glass layer 202 is screen printed with a silver frit heated circuit. The circuit has a power density of 15 watts/dm2. At a starting temperature of 20° C., the maximum temperature of the circuit is 65° C. A polyurethane plastic interlayer, with a Tg lower than −20° C. and minimal overlap of its glass transition range with the heated circuit operating range is selected and used for the insert.

3. The windshield of FIG. 5, has a standard soda-lime 2.5 mm thick clear exterior glass layer 201 and 2.1 mm soda-lime solar green interior glass layer 202. Black frit 6 is screen printed on surface two and surface four. The black frit 6 frames the camera field of view 32 area and also served to obscure the boundary between the PVB and the interlayer insert 22 in the finished laminate. The glass layers are thermally bent using a gravity bending process.

In addition to the sunshade, the windshield also comprises a performance film. A second plastic bonding layer is required to bond the opposite faces of the performance film to the glass layers. A sheet of 0.38 clear PVB, with no sunshade is used and does not require any alteration in the camera field of view.

In the camera field of view area 32, a cutout 8 is made in the 0.76 mm thick PVB plastic bonding interlayer 4. The opening for the camera field of view 32, in the black obscuration, has a trapezoidal shape and is approximately 170 mm by 170 mm. A 0.76 mm thick PVB interlayer 4 with a blue gradient tint sunshade 20 is used. The AS1 line is located in the camera field of view. A cutout which is 10 mm larger than the opening in the black obscuration 6 is made in the PVB plastic bonding interlayer sheet 4. The cutout PVB is removed and not used. An insert 22, cut to the approximate size of the cutout is made from a thermally stable polymer. The insert is placed into the opening as the bent glass layers are being assembled.

The same steps are repeated with the plastic performance film 12. In the camera field of view area 32, a cutout 28 is made in the 0.3 mm thick plastic performance film 12. A cutout 28 which is 10 mm larger than the opening in the black obscuration 6. The cutout 28 in the performance film is removed and not used. An insert 24, cut to the approximate size of the cutout 28 is made from a sheet of clear 0.30 mm plastic (PU). The insert 24 is placed into the cutout 28 as the bent glass layers are being assembled.

The assembled laminated is processed, using standard automotive laminating equipment, and the insert becomes a permanent part of the laminate. The plastic interlayer insert is provided with an embedded wire circuit comprised of 20 μm diameter tungsten wire. The circuit has a power density of 15 watts/dm2. At a starting temperature of 20° C., the maximum temperature of the circuit is 50° C. A polyurethane plastic interlayer, with a Tg lower than 0° C. and minimal overlap of the glass transition range with the heated circuit operating range is selected and used for the insert.

The invention claimed is:

1. A vehicle laminated glazing having a camera field of view area with reduced distortion, comprising:
   at least two glass layers, an outer glass layer and an inner glass layer;
   a resistive heating circuit between the outer and inner glass layers that heats at least a portion of the inner or outer glass layers in the camera field of view area, the resistive heating circuit having an operating temperature range from 0 to 70° C.;
   a plastic layer placed between the outer and inner glass layers, wherein the plastic layer has a cutout in the area that is heated by the resistive heating circuit, and wherein the plastic layer has a glass transition temperature that falls within the operating temperature range of the heating circuit; and
   an insert placed into the cutout of the plastic layer, comprised of an interlayer having a glass transition temperature that falls outside the range from 0 to 70° C. which corresponds to the operating temperature range of the heating circuit, and wherein the insert has a thickness that is about the same as the corresponding plastic layer.

2. The vehicle laminated glazing of claim 1 wherein the plastic layer is a plastic bonding layer.

3. The vehicle laminated glazing of claim 1 wherein the plastic layer is a performance film.

4. The vehicle laminated glazing of claim 1, wherein the insert extends to the edge of the laminated glazing.

5. The vehicle laminated glazing of claim 3, wherein the performance film layer is a solar control film.

6. The vehicle laminated glazing of claim 1, wherein the laminate comprises an infra-red reflecting coating.

7. A vehicle comprising the vehicle laminated glazing of claim 1.

8. A vehicle laminated glazing of claim 1, wherein the glass transition temperature of the interlayer insert is lower than 0° C.

9. A vehicle laminated glazing of claim 2, wherein the plastic bonding layer is a PVB plastic bonding layer.

10. A vehicle laminated glazing of claim 1, wherein the interlayer insert is a polyurethane interlayer.

11. A vehicle laminated glazing of claim 3, wherein the performance film is disposed between two plastic bonding layers.

12. A vehicle laminated glazing of claim 1, wherein the resistive heating circuit is a wire circuit embedded in the interlayer insert.

13. A vehicle laminated glazing of claim 1, wherein the plastic layer is a PVB plastic bonding layer and the interlayer insert is a polyurethane interlayer.

14. A vehicle laminated glazing having a camera field of view area with reduced distortion, comprising:
   at least two glass layers, an outer glass layer and an inner glass layer;
   a resistive heating circuit disposed on the inner glass layer that heats at least a portion of the inner glass layer in the camera field of view area, the resistive heating circuit having an operating temperature range from 0 to 70° C.;
   a plastic layer placed between the outer and inner glass layers, wherein the plastic layer has a cutout in the area that is heated by the resistive heating circuit, and wherein the plastic layer has a glass transition temperature that falls within the operating temperature range of the heating circuit; and
   an insert placed into the cutout of the plastic layer, comprised of an interlayer having a glass transition temperature that falls outside the range from 0 to 70° C. which corresponds to the operating temperature range of the heating circuit, and wherein the insert has a thickness that is about the same as the corresponding plastic layer.

15. The vehicle laminated glazing of claim 14, wherein the resistive heating circuit is a printed silver frit heating circuit applied to the inner glass layer.

* * * * *